United States Patent
Kuwahara et al.

(10) Patent No.: US 6,907,757 B2
(45) Date of Patent: Jun. 21, 2005

(54) DRAWING METHOD OF OPTICAL FIBER AND DRAWING FURNACE

(75) Inventors: Kazuya Kuwahara, Yokohama (JP); Katsuya Nagayama, Yokohama (JP); Ichiro Tsuchiya, Yokohama (JP); Masashi Onishi, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 508 days.

(21) Appl. No.: 10/078,269

(22) Filed: Feb. 20, 2002

(65) Prior Publication Data

US 2002/0174692 A1 Nov. 28, 2002

(30) Foreign Application Priority Data

Feb. 21, 2001 (JP) .................................. 2001-045414

(51) Int. Cl.$^7$ .............................................. C03B 37/02
(52) U.S. Cl. .................... 65/424; 65/435; 65/537; 65/382; 65/491
(58) Field of Search ................... 65/382, 384, 424, 65/430, 431, 432, 435, 447, 475, 477, 488, 491, 507, 509, 510, 513, 529, 530, 533, 537, 538, 187; 264/1.24, 2.6, 2.7

(56) References Cited

U.S. PATENT DOCUMENTS

| | | | | |
|---|---|---|---|---|
| 4,101,300 A | * | 7/1978 | Imoto et al. ................. | 65/382 |
| 4,400,190 A | * | 8/1983 | Briere ........................... | 65/498 |
| 5,059,229 A | * | 10/1991 | Blankenship et al. ........ | 65/424 |
| 5,637,130 A | * | 6/1997 | Nagayama et al. ........... | 65/435 |
| 6,178,778 B1 | * | 1/2001 | Kenmochi et al. ............. | 65/381 |
| 2002/0116956 A1 | * | 8/2002 | Fukunaga et al. ............. | 65/435 |

FOREIGN PATENT DOCUMENTS

| | | | | |
|---|---|---|---|---|
| JP | 61-147233 | | 9/1986 | |
| JP | 4-198036 | | 7/1992 | |
| JP | 6-2603 | | 1/1994 | |
| JP | 8-9490 | | 1/1996 | |
| JP | 2000-233938 | * | 8/2000 | ......... C03B/37/012 |

* cited by examiner

Primary Examiner—Eric Hug
(74) Attorney, Agent, or Firm—McDermott Will & Emery LLP

(57) ABSTRACT

The drawing method of the present invention uses a drawing furnace comprising a furnace muffle tube, a furnace body and a heater. According to the method, an optical fiber preform is inserted from the inlet of the furnace muffle tube, the optical fiber preform is melted by means of a heater, under a specified gas atmosphere, and is drawn toward the outlet of the furnace muffle tube by means of a specified drawing tension. The optical fiber preform and the drawing furnace used in this method both satisfy the condition of below-indicated formula (1):

$$L/D \geq 8 \qquad (1)$$

wherein L indicates the length of the furnace body in the drawing direction and D indicates the diameter of the optical fiber preform. Through this method, even for the case of drawing optical fibers having a large relative index difference between the central core and the cladding, optical fibers wherein residual amounts of lattice defects are sufficiently reduced and degradation of characteristics under a hydrogen atmosphere is sufficiently suppressed can be obtained efficiently and at low cost.

4 Claims, 2 Drawing Sheets

DRAWING METHOD OF OPTICAL FIBER AND DRAWING FURNACE

BACKGROUND OF THE INVENTION

1. Field of the Invention

The present invention relates to a drawing method for optical fiber and a drawing furnace, and more particularly to a method for drawing an optical fiber while heat softening the optical fiber preform in a drawing furnace and to a drawing furnace used therefor.

2. Description of the Related Art

Compared to copper wire, optical fiber has the advantages of small size, light weight, low transmission loss, suitability for broadband transmission, etc. and has thus been increasingly adopted for telecommunication lines.

In conventional optical fiber manufacturing processes, normally a drawing furnace of the kind shown in FIG. 4 is used. Optical fiber preform 1 is inserted into furnace muffle tube 4 of drawing furnace 3, and the tip of preform 1 is melted by means of heater 6 which is positioned inside furnace body 5 and peripheral to furnace muffle tube 4. Optical fiber of the desired diameter is obtained by drawing the preform while applying a specified drawing tension by means of a capstan (not shown in the figure) and so on.

A variety of manufacturing methods and manufacturing equipments have been proposed for the manufacturing of optical fiber. For example, in Japanese Patent Application Laid-open No. Hei4-198036 a heating furnace having an annealing heater in its upper part has been disclosed, while in Japanese Utility Model Application Laid-open No. Sho61-147233 a heating furnace having a coil-shaped heater has been disclosed. In addition, in Japanese Patent Publication No. Hei6-2603, optical fiber manufacturing equipment having a anealing furnace between the drawing furnace and the coating equipment, and manufacturing equipment which uses that method have been disclosed and it is mentioned therein that defects in the optical fiber can be reduced by making the temperature distribution of the heat treatment furnace increase with proximity to the optical fiber preform. Furthermore, in Japanese Patent Publication No. Hei8-9490 a fiber drawing method has been disclosed wherein the specified conditions are achieved through the relationship between the length of the optical fiber preform and the line speed.

Recently demand has increased for optical fiber, such as dispersion compensation fiber, wherein the relative index difference (Δ+) of the center core compared to that of the cladding exceeds 1%. As means of achieving a higher deviation in the specific refraction index of optical fiber, the method of adding a germanium compound, such as germanium dioxide ($GeO_2$), to the core has been proposed. In the core of optical fibers obtained in this way, a network of silicon atoms and germanium atoms bonded via oxygen atoms (Si—O—Ge) is formed.

SUMMARY OF THE INVENTION

With the above-mentioned problems of the conventional technology in view, it is an object of the present invention to provide an optical fiber drawing method which enables optical fibers wherein the residual amounts of lattice defects of the type which display reactivity to hydrogen molecules is sufficiently reduced and wherein degradation of characteristics under a hydrogen atmosphere is sufficiently suppressed, even for the case of drawing optical fibers having a large relative index difference, to be obtained efficiently and at low cost.

As a result of lengthy and earnest research efforts, the inventors of the present invention found the above-mentioned problems were solved by using, for heating and melting of optical fibers by means of a drawing furnace and for the drawing of optical fibers, a drawing furnace and an optical fiber preform each of which met specific conditions, and the inventors thus perfected the present invention.

The fiber drawing method of the present invention uses a drawing furnace comprising a furnace muffle tube into which the optical fiber preform is inserted, a furnace body surrounding the furnace muffle tube, and a heater positioned inside the furnace body and peripheral to the furnace muffle tube, comprising steps of:

inserting the optical fiber preform from the inlet of said furnace muffle tube;

heating and melting the optical fiber preform by means of said heater under a specified gas atmosphere; and drawing an optical fiber toward the outlet of the furnace muffle tube with a specified drawing tension;

wherein the optical fiber preform and the drawing furnace used in the drawing method satisfy the condition of below-indicated Formula (1):

$$L/D \geq 8 \quad (1)$$

where, in Formula 1, L means the length [mm] of the furnace body in the drawing direction and D means the diameter [mm] of the optical fiber preform.

In addition, the drawing furnace of the present invention comprises a furnace muffle tube into which the optical fiber preform is inserted, a furnace body surrounding the furnace muffle tube, and a heater positioned inside the furnace body and peripheral to the furnace muffle tube, wherein the inner diameter of the furnace muffle tube and the length of the furnace body in the drawing direction both satisfy the condition expressed in the below-indicated formula (3):

$$L/D' \geq 4 \quad (3)$$

wherein L is the length [mm] of the furnace body in the drawing direction and D' is the inner diameter [mm] of the furnace muffle tube. The furnace makes it possible to draw optical fiber preform which satisfies the condition expressed in below-indicated formula (1):

$$L/D \geq 8 \quad (1)$$

wherein L is the length [mm] of the furnace body in the drawing direction and D is the diameter [mm] of the optical fiber preform.

In the optical fiber drawing method of the present invention, by using an optical fiber preform and a drawing furnace which both satisfy the condition expressed in above-mentioned formula (1), thermal dissociation of the of the Si—O—Ge bonds, etc. can be sufficiently suppressed because the maximum temperature in neck down region of the optical fiber preform can be sufficiently reduced. Even in cases where thermal dissociation of the Si—O—Ge has occurred, re-bonding of the thermally dissociated Si—O—Ge bonds, etc. can be sufficiently promoted because glass cooling speed is sufficiently reduced in the lower part of the necking down region (usually, from 1600 to 1900° C.). Consequently, by means of the drawing method of the present invention, the residual amounts of defects of the type which display reactivity to hydrogen molecules can be sufficiently reduced, and optical fibers wherein degradation of characteristics under a hydrogen atmosphere is sufficiently suppressed can be obtained efficiently and reliably.

In the present invention, in the case of helium gas atmosphere, it is desirable to use an optical fiber preform and a drawing furnace used satisfy the condition expressed in below-indicated formula (2):

$$L/D \geq 9 \quad (2)$$

wherein, L is the length [mm] of the furnace body in the drawing direction and D is the diameter [mm] of the optical fiber preform.

The present invention exhibits outstanding results, particularly in the case of a preform having more than 1% relative index difference between the center core and the cladding is used as optical fiber preform.

In the present invention, it is desirable that the drawing tension is 8 MPa or more.

DESCRIPTION OF THE PREFERRED EMBODIMENTS

Preferred embodiments of the present invention will be described in detail below referring to the figures as occasion demands. Incidentally, in the figures, parts which are the same or equivalent are referred to by the same numerals.

Figure 1:
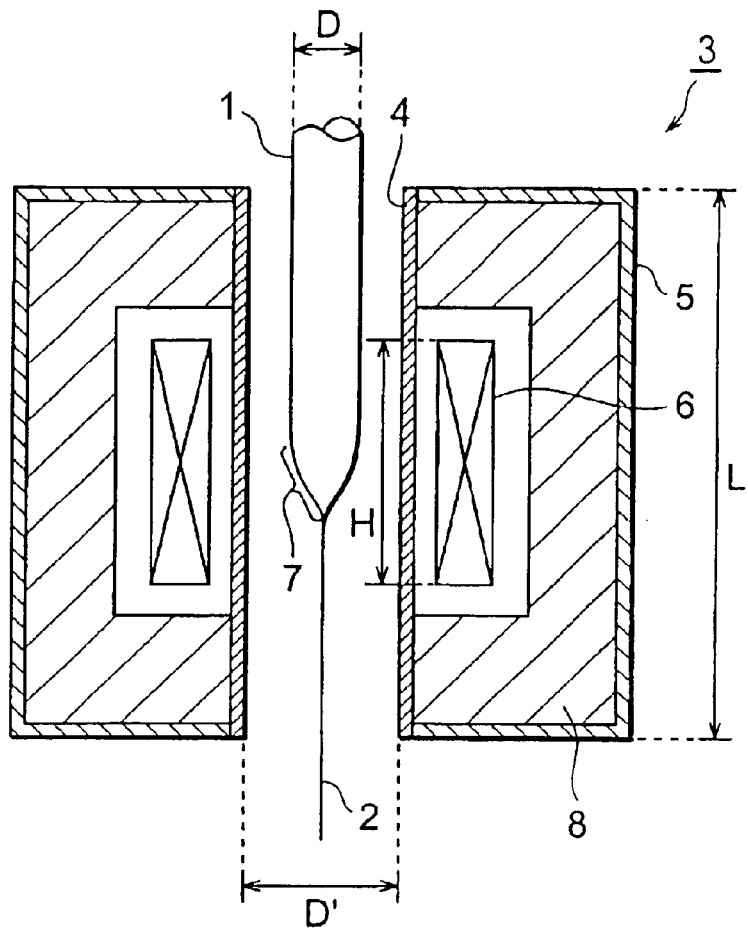
FIG. 1 is a schematic configuration drawing showing a preferred embodiment of the optical fiber drawing furnace of the present invention.

FIG. 1 is a schematic configuration drawing showing a preferred embodiment of the drawing furnace of the present invention. In FIG. 1, drawing furnace 3 comprises a furnace muffle tube 4 for insertion of optical fiber preform 1, a furnace body 5 surrounding the furnace muffle tube 4, and a heater 6 positioned inside furnace body 5 and peripheral to furnace muffle tube 4. Heater 6 is electrically connected to control equipment (not shown in the figure) and it is thus possible to control the amount of heat generation of heater 6. In addition, the space between furnace muffle tube 4 and furnace body 5 is filled with a heat-insulating material 8.

Further, an atmosphere of non-reactive gas such as nitrogen ($N_2$), helium (He), argon (Ar) is maintained in drawing furnace 3, and the non-reactive gases flow from the inlet of drawing furnace 3 toward its outlet.

In an optical fiber drawing process using a drawing furnace having the above-described configuration, glass fiber 2 of the desired diameter is obtained by inserting optical fiber preform 1 into furnace muffle tube 4, heating and melting it by means of heater 6, and drawing it while applying a drawing tension. Glass fiber 2 obtained in this way is usually coated with a resin on its periphery and then wound up as an optical fiber.

Optical fiber preform 1 and drawing furnace 3 used in the present invention both satisfy the condition of below-indicated formula (1):

$$L/D \geq 8 \quad (1)$$

wherein L is the length [mm] of the furnace body in the drawing direction and D is the diameter [mm] of the optical fiber preform. In the above-indicated formula (1), if L/D is less than 8, in the necking down region 7 thermal dissociation of the Si—O—Ge bonds, etc. may readily occur. Moreover, in the lower part of the necking down region 7 (usually from 1600 to 1900° C.) it becomes difficult to cause re-bonding of the thermally dissociated S—O—Ge bonds, etc. and the stability against hydrogen of the optical fiber thus obtained is inadequate. On the other hand, accompanying an increase in L/D, the stability against hydrogen of the optical fiber thus obtained tends to improve, but it is preferable that L/D be not more than 20. For example if L is excessively large and L/D exceeds the above-indicated upper limit, cost will tend to become excessively high because of the increased size of the drawing furnace. In the case that D becomes small and L/D exceeds the above-indicated upper limit, the size of the optical fiber preform becomes small, and production efficiency tends to decline.

In the case that drawing of the optical fiber is done in a helium atmosphere, it is preferable to use an optical fiber preform 1 and drawing furnace 3 that both satisfy the condition expressed in below-indicated formura (2):

$$L/D \geq 9 \quad (2)$$

wherein L is the length [mm] of the furnace body in the drawing direction and D is the diameter [mm] of the optical fiber preform. Compared to the case of performing the optical fiber drawing in a nitrogen atmosphere, the glass cooling speed increases and as a result, if L/D is less than 9, there is a tendency for defects to remain in the optical fiber and the stability against hydrogen to decline.

Optical fiber preform 1 meeting the condition expressed in above-indicated formula (1) is inserted into furnace muffle tube 4 of drawing furnace 3. Here it is necessary that furnace muffle tube 4 satisfy the condition expressed in below-indicated formula (3):

$$L/D' \geq 4 \quad (3)$$

wherein L is the length [mm] of the furnace body in the drawing direction and D' is the inner diameter [mm] of the furnace muffle tube. It is desirable that L/D'≧7.5. If L/D' is less than the above-indicated lower limit, a furnace body unnecessarily thick in relation to the preform diameter will be necessary. On the other hand, although for the upper limit of L/D' there is no particular limit from the standpoint of suppressing deterioration of characteristics under a hydrogen atmosphere, if L/D' becomes excessively large, an unnecessarily long furnace body longer is needed. Either case could lead to increases in equipment cost, etc., and so neither is desirable. In actual usage, L/D' on the order of 10 is preferable.

In addition, there are no particular limitation on heater 6 which is equipped with drawing furnace 3, so long as it enables to heat and soften an optical fiber preform 1, but it is preferable that heater 6 be one which satisfies the condition of below indicated formula (4):

$$0.2 \leq H/L \leq 0.8 \quad (4)$$

wherein H is the length of the heating portion of the heater in the drawing direction and L is the length of the furnace body in the drawing direction. If H/L is less than the above-indicated minimum value, the heating region in the drawing direction will be excessively short and the stability of drawing will tend to decrease. On the other hand, if H/L exceeds the above-indicated maximum value, at the lower part of the necking down region temperature change in the drawing direction will be large and it will be difficult for defects resulting from thermal dissociation of Si—O—Ge bonds to re-bond. Thus the stability against hydrogen of the optical fibers thus obtained will tend to decline.

In the manufacturing method of the present invention, there is no particular limitation on temperature within drawing furnace 3 so long as it is possible to heat and soften an optical fiber preform 1 and to draw it, but it is desirable that the temperature in the furnace center be from 1700 to 2300° C. If the temperature within drawing furnace 3 is less than the above-indicated minimum value, it will be difficult to melt optical preform 1, while on the other hand, if the temperature exceeds the above-indicated maximum value, the optical fiber preform will become excessively soft. In either case, obtaining optical fiber of the desired diameter efficiently and reliably will tend to be difficult.

The drawing tension applied when drawing optical fiber may be suitably selected according to the structure of the preform, such as the amount of germanium added in the center core part; the diameter of the optical fiber preform; the target diameter of the optical fiber; the drawing speed (line speed); etc., and is desirably 80 MPa and more desirably from 90 to 400 MPa. If the drawing tension is less than the above-indicated minimum value, the stability against hydrogen of the optical fiber thus obtained will tend to decline, while on the other hand, if it exceeds the above-indicated maximum, the glass melting condition in the lower part of the necking down region will become unstable and performing steady drawing will tend to be difficult.

The optical fiber drawing speed (line speed) may be suitably selected according to the diameter of the optical fiber preform and the target diameter of the optical fiber, but it is preferably from 200 to 800 m/min.

The optical fiber drawing method of the present invention can be applied to either single-mode optical fiber or multi-mode optical fiber.

If optical fibers containing high concentrations of germanium compounds in the core part are manufactured by conventional methods, defects such as non-bridging oxygen hole centers appear. As a result, the characteristic that, under a hydrogen atmosphere, optical fiber transmission losses for light having a wavelength of 1.38 μm does not increase (the stability against hydrogen) becomes inadequate. This appearance of non-bridging hole centers becomes quite remarkable in the case that larger optical fiber preform is used or line speed is increased, and thus efficient and reliable mass production of optical fibers having a large relative index difference of the center core becomes very difficult.

For example, in the case of using the heating furnaces described in Japanese Patent Application Laid-open No. Hei4-198036, Japanese Utility Model Application Laid-open No. Sho61-147233 and Japanese Patent Publication No. Hei8-9490, it is impossible to prevent thermal dissociation of the Si—O—Ge bonds during the optical fibers drawn thereby, and the optical fibers thus obtained cannot be put to actual use due to their poor stability against hydrogen. With the method described in Japanese Patent Publication No. Hei6-2603, residual defects are reduced, but in order to obtain optical fibers having a sufficiently high stability against hydrogen, it is necessary to lengthen greatly the optical fiber residence time in the heat-treating furnace and make the length of the heat-treating furnace in the drawing direction very long. Thus, from the standpoint of production efficiency the method is still inadequate.

When manufacturing silica-type optical fibers wherein the deviation of the specific refractive index of the center core relative to the cladding exceeds 1%, as with optical fibers containing germanium compounds in the core part, the optical fiber manufacturing method of the present invention is very useful. This is because the method of the present invention enables sufficiently high productivity to coexist with a sufficiently high stability against hydrogen, which is very difficult to achieve with conventional methods.

EXAMPLES

The present invention is described below even more specifically, based on examples and comparison examples, but the present invention is in no way limited to the following examples.

Figure 2:
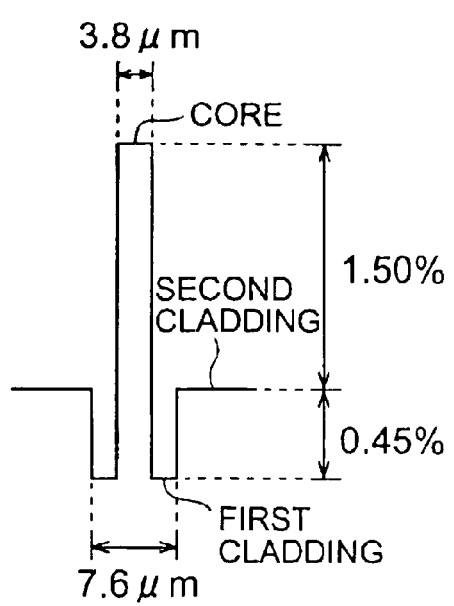
FIG. 2 is an explanatory drawing showing the distribution of the refractive index of the optical fiber preform used in the embodiment.

Furthermore, the optical fiber preform used in the below examples and comparison examples in all cases is one wherein germanium oxide has been added to the core and fluorine has been added to the first cladding, and moreover the refractive index of the core, first cladding, and second cladding has the profile shown in FIG. 2.

Example 1

Optical fiber preform of diameter 35 mm is inserted into the furnace muffle tube of a drawing furnace of the configuration shown in FIG. 1, wherein the inner diameter (D') of the furnace muffle tube is 45 mm, the length of the furnace body in the drawing direction (L) is 350 mm, and the length of the heater in the drawing direction (H) is 150 mm. While heating and melting the optical fiber preform under a nitrogen atmosphere with the heater temperature set to 1950° C., drawing was done at a line speed of 300 m/min and at a drawing tension of 200 g, and an optical fiber with a diameter of 125 μm was obtained.

Examples 2 through 11 and Comparison Examples 1 through 7

In examples 2 through 11 and comparison examples 1 through 7, optical fiber with a diameter of 125 μm was obtained in the same manner of example 1 except that [a] optical fiber preform having the diameter shown in Table 1 for each example was used, [b] a drawing furnace having the configuration shown in FIG. 1 and the dimensions for inner diameter (D') of furnace muffle tube, length of furnace body in the pulling direction (L), and length of the heater in the drawing direction (H) shown in Table 1 for each example was used, and [c] when drawing the fiber, for each example, the atmosphere inside the furnace was as shown in Table 1.

(Evaluation Test for Stability Against Hydrogen)

Optical fibers obtained in examples 2 through 11 and comparison examples 1 through 7 were measured for the amount of change in transmission loss of light of wavelength 1.38 μm (Δ1.38 [dB/km]) after versus before aging1 for 4 days at 20° C. in a mixed gas atmosphere consisting of 1 volume % hydrogen and 99 volume % nitrogen.

Figure 3:
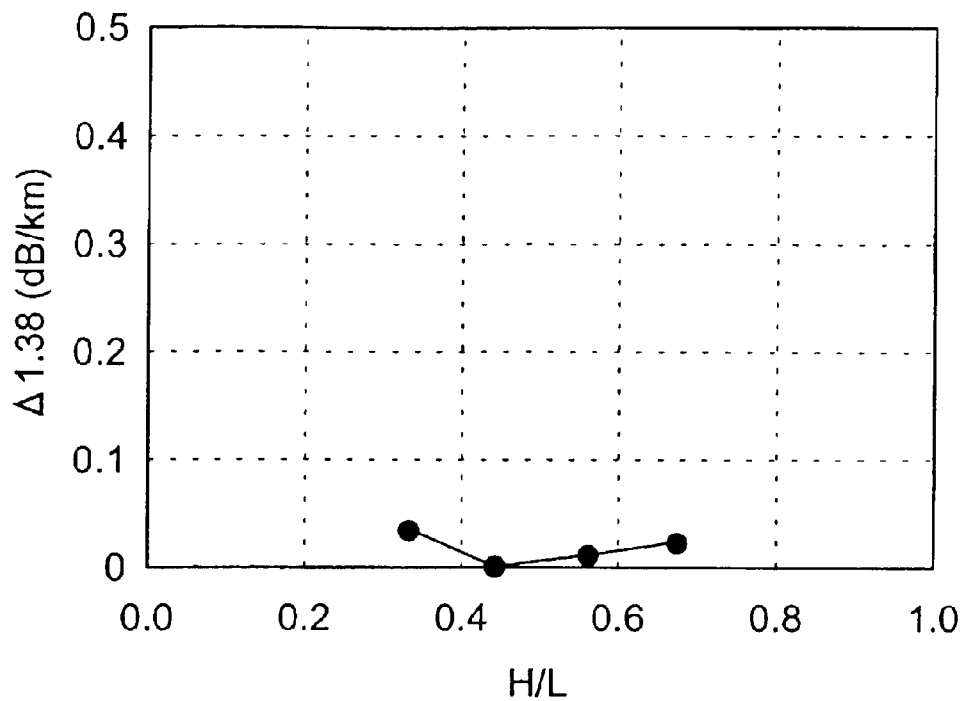
FIG. 3 is a graph showing the mutual relationship between H/L and the transmission loss amount at a wavelength of 1.38 μm.
Figure 4:
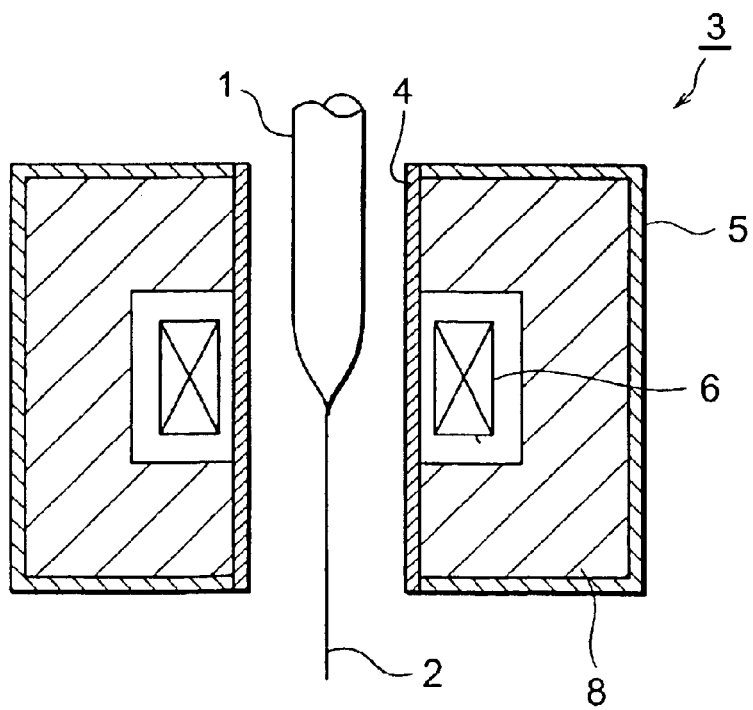
FIG. 4 is a schematic configuration drawing showing an example of a conventional optical fiber drawing furnace.

In addition, based on the results of embodiments 3, 4, 5, and 6 in which drawing furnaces was used with different H/L ratios, FIG. 3 shows the mutual relationship between H/L and the amount of change in transmission loss for light of wavelength 1.38 μm after versus before hydrogen treatment.

TABLE 1

| | D [mm] | D' [mm] | L [mm] | H [mm] | H/D | H/L | Atmosphere | Increase of transmission loss [dB/km] |
|---|---|---|---|---|---|---|---|---|
| Example 1 | 35 | 45 | 350 | 150 | 10.0 | 0.43 | $N_2$ | 0.00 |
| Example 2 | 35 | 45 | 350 | 150 | 10.0 | 0.43 | He | 0.05 |
| Example 3 | 35 | 45 | 350 | 110 | 10.0 | 0.31 | $N_2$ | 0.04 |
| Example 4 | 35 | 45 | 350 | 150 | 10.0 | 0.43 | $N_2$ | 0.00 |
| Example 5 | 35 | 45 | 350 | 200 | 10.0 | 0.57 | $N_2$ | 0.01 |
| Example 6 | 35 | 45 | 350 | 230 | 10.0 | 0.66 | $N_2$ | 0.02 |
| Example 7 | 50 | 60 | 470 | 200 | 9.40 | 0.43 | $N_2$ | 0.05 |
| Example 8 | 50 | 60 | 470 | 200 | 9.40 | 0.43 | He | 0.12 |
| Example 9 | 50 | 60 | 660 | 280 | 13.2 | 0.42 | $N_2$ | 0.00 |
| Example 10 | 50 | 60 | 660 | 280 | 13.2 | 0.42 | He | 0.00 |
| Example 11 | 70 | 85 | 660 | 280 | 9.43 | 0.42 | He | 0.10 |
| Comparison Example 1 | 35 | 45 | 260 | 110 | 7.43 | 0.42 | $N_2$ | 0.20 |
| Comparison Example 2 | 35 | 45 | 260 | 110 | 7.43 | 0.42 | He | 0.35 |
| Comparison Example 3 | 50 | 60 | 260 | 110 | 5.20 | 0.42 | $N_2$ | 0.40 |
| Comparison Example 4 | 50 | 60 | 350 | 150 | 7.00 | 0.43 | $N_2$ | 0.18 |
| Comparison Example 5 | 50 | 60 | 350 | 150 | 7.00 | 0.43 | He | 0.42 |
| Comparison Example 6 | 70 | 85 | 350 | 150 | 5.00 | 0.43 | He | 0.80 |
| Comparison Example 7 | 70 | 85 | 470 | 200 | 6.72 | 0.43 | He | 0.50 |

As is clear from the results shown in Table 1, it has been confirmed that increase in transmission loss under a hydrogen atmosphere has been sufficiently suppressed for all of the optical fibers obtained in examples 1 through 11 and that the optical fibers obtained through the methods in examples 1 through 11 of the present patent have sufficiently high stability against hydrogens. In addition, as shown in FIG. 3, in the optical fibers of examples 3, 4, 5, 6 which used drawing furnaces of different H/D, no large difference in stability against hydrogens can be seen and sufficiently high stability against hydrogens are shown in all cases.

As described above, optical fibers wherein the residual amount of lattice defects of the type that show reactivity to hydrogen molecules has been sufficiently reduced and degradation of characteristics under a hydrogen atmosphere has been sufficiently suppressed can be obtained efficiently and at a low cost by means of the optical fiber drawing method of the present invention. As a result, the present invention is particularly useful in drawing optical fibers having a large deviation in the specific refractive index of the center core.

What is claimed is:

1. A drawing method of optical fibers using a drawing furnace comprising a furnace muffle tube into which an optical fiber preform is inserted, a furnace body surrounding said furnace muffle tube, and a heater positioned inside said furnace body and peripheral to said furnace muffle tube, said method comprising steps of:
   inserting said optical fiber preform from the inlet of said furnace muffle tube;
   heating and melting said optical fiber preform by means of said heater under a specified gas atmosphere; and
   drawing an optical fiber toward the outlet of said furnace muffle tube with a specified drawing tension;
   wherein said optical fiber preform and said drawing furnace used in said drawing method satisfy the condition of below-indicated Formula (1):

$$8 \leq L/D \leq 20 \quad (1)$$

where, in Formula 1, L means the length [mm] of the furnace body in the drawing direction and D means the diameter [mm] of the optical fiber preform, and said optical fiber preform used in the drawing method has a relative index difference of 1% or greater between the center core and the cladding thereof.

2. A drawing method of optical fibers according to claim 1, wherein said gas is helium, and said optical fiber preform and said drawing furnace used in the drawing method satisfy the condition of below-indicated Formula (2):

$$9 \leq L/D \leq 20 \quad (2)$$

where, in Formula 2, L means the length [mm] of the furnace body in the drawing direction and D means the diameter [mm] of the optical fiber preform.

3. A drawing method of optical fibers according to claim 1, wherein said drawing tension is 80 MPa or greater.

4. A drawing furnace comprising:
   a furnace muffle tube into which an optical fiber preform is inserted;
   a furnace body surrounding said furnace muffle tube; and
   a heater positioned inside said furnace body and peripheral to said furnace muffle tube;
   wherein the inner diameter of said furnace muffle tube and the length of said furnace body in the drawing direction satisfy the condition of below-indicated Formula (3):

$$4 \leq L/D' \leq 10 \quad (3)$$

where, in Formula 3, L means the length [mm] of the furnace body in the drawing direction and D' means the inner diameter of said furnace muffle tube, and
   wherein said drawing furnace is capable of drawing an optical fiber preform that satisfies the condition of below-indicated Formula (1):

$$8 \leq L/D \leq 20 \quad (1)$$

where, in Formula 1, L means the length [mm] of the furnace body in the drawing direction and D means the diameter [mm] of the optical fiber preform.

* * * * *